United States Patent Office 3,279,989
Patented Oct. 18, 1966

3,279,989
PROCESS FOR CRYSTALLIZING ACTINO-
SPECTACIN SULFATE
Heinz K. Jahnke, Kalamazoo, Mich., assignor to The
Upjohn Company, Kalamazoo, Mich., a corporation of
Delaware
No Drawing. Filed May 31, 1962, Ser. No. 198,753
3 Claims. (Cl. 167—65)

This invention pertains to a novel chemical process, and more particularly, it pertains to an improved process for obtaining crystalline actinospectacin sulfate from solutions containing the same. Still more particularly, the invention is directed to a method using methanol for removing impurities from such solutions after adjustment to about pH 8 at which pH the actinospectacin sulfate remains in solution, and then crystallizing the actinospectacin sulfate by acidifying to an acid pH.

Actinospectacin is a basic compound elaborated by the microorganism *Streptomyces spectabilis* under controlled culture conditions in a nutrient medium. The compound is active against microorganisms, particularly bacteria; and it can be used in the form of the free base or in the form of acid addition salts to control microorganisms. For example, actinospectacin, or its salts, can be incorporated in a wash solution for cleansing the person, as well as contaminated surfaces of buildings, furnishings, and laboratory equipment. Moreover, it has been found that actinospectacin and its salts are active either alone or in conjunction with other antibiotics when formulated with feed nutrients for stimulating the growth of mammals and birds. It can also be used for selective control of microorganisms in biologic media and as an industrial preservative, for example, as an antiseptic impregnant of laundered clothing, paper products, and fabrics.

Various methods for the production, recovery, and purification of actinospectacin are described in published literature, e.g., D. J. Mason et al., Antibiotics and Chemotherapy, 11, 118 (1961); M. E. Bergy et al., ibid., 11, 661 (1961); Republic of South Africa Patent No. 60/4,098; and Belgian Patent No. 596,175; but a process for direct solvent crystallization of actinospectacin sulfate from cation exchange resin eluates is not described. Such eluates contain metal ions adsorbed and eluted from the cation exchange resin along with actinospectacin. These metal ions, for example, calcium, magnesium, iron, aluminum, sodium, potassium, and the like, originate from the components of the nutrient medium or are introduced during the isolation procedure and interfere with recovery of actinospectacin sulfate in pure form. Such eluates also contain greater or lesser amounts of uncharacterized organic impurities, originating in the nutrient medium or produced during fermentation, which are carried along with the actinospectacin in the recovery procedure. The problem is, therefore, one of removing such impurities from solutions of actinospectacin sulfate such as the cation exchange eluates so that crystallization of the antibiotic in pure form can be effected.

In accordance with a procedure for crystallizing actinospectacin sulfate from aqueous solutions containing the same by adding methanol, the aqueous solution, for example, an eluate or a concentrated eluate, is neutralized and about 4 volumes of methanol is added. The methanol causes precipitation of metal salts and organic impurities present, and the precipitate is separated from the solution of actinospectacin sulfate by filtration. The filtrate is then seeded in order to initiate crystallization of the actinospectacin sulfate. This method has the advantage that it permits neutralization of excess sulfuric acid with sodium hydroxide since the added sodium is later removed as sodium sulfate on addition of the methanol. The process has one disadvantage, however, in that concentrations of actinospectacin sulfate greater than about 50,000γ/ml. (actinospectacin sulfate) frequently begins to crystallize before precipitation and filtration have been completed. The process of this invention overcomes this difficulty inherent in the original methanol crystallization process, and assures the crystallization of actinospectacin sulfate substantially free from impurities even when actinospectacin sulfate is present in concentrations as high as 160,000γ/ml. or more.

In accordance with the invention, it has been found that at about pH 8 actinospectacin sulfate does not crystallize from aqueous solution on addition of methanol. On the other hand, the metal salts and organic impurities do precipitate at about pH 8 when methanol is added. Hence, such impurities can be removed by filtration, and the aqueous methanol solution then acidified to effect crystallization of actinospectacin sulfate.

In the practice of the improved process of this invention a solution of actinospectacin sulfate is adjusted to about pH 7.5 to about pH 8.5 with a base such as sodium hydroxide, potassium hydroxide, sodium carbonate, ammonium hydroxide, methylamine, dimethylamine, and the like. If desired, the adjustment to about pH 8 can be accomplished by removing the excess sulfuric acid with an anion exchange resin in hydroxyl form. Suitable anion exchange resins for this purpose are obtained by chloromethylating by the procedure described in "Ion Exchange Resins," Kunin, pages 88 and 97 (1958, 2nd ed.), John Wiley & Sons, Inc., N.Y., polystyrene cross-linked, if desired, with divinylbenzene prepared by the procedure given on page 84 of Kunin, supra, and reacting with trimethylamine, dimethylamine, or dimethylethanolamine, by the procedure given on page 97 of Kunin, supra. Anion exchange resins of this type are marketed under the trade name Dowex 1, Dowex 2, Dowex 3, Dowex 21K, Ionac A–300, Amberlite IRA–400, Amberlite IR–45, Duolite A–102, and Duolite A–2, A–4, and A–6.

The alkaline solution is then treated with methanol. The methanol causes precipitation of the metal salts and organic impurities, and they are removed by filtration. The filtered solution of actinospectacin sulfate is then acidified with sulfuric acid to a pH suitable for crystallization. In general, enough acid is added to adjust the solution to pH 4 to 6, preferably about pH 5. When crystallization is complete the crystals of actinospectacin sulfate are recovered by filtration.

The concentration of actinospectacin in aqueous solutions is determined by assaying its activity against the microorganism *Klebsiella pneumoniae* by standard agar diffusion procedures as described by L. J. Hanka et al., Antibiotics and Chemotherapy, 11, pp. 123–126 (1961). The assays reported herein are based on the content of actinospectacin free base.

Advantageously, concentrated solutions of actinospectacin sulfate for crystallization in accordance with the process of this invention are prepared from whole beer by the following preferred procedure:

A whole beer is acidified to less than about pH 3.5 and filtered. The acidification is advantageously accomplished with a strong, nonoxidizing mineral acid, for example, concentrated sulfuric acid (preferred), hydrochloric, phosphoric, and the like. The filtered beer is then adjusted to about pH 5.5 to pH 7.0 with a base, for example, sodium hydroxide, sodium carbonate, and like bases. The neutralized beer is then brought into contact with a cation exchange resin in, for example, the hydrogen, the sodium, and like forms. Various carboxylic acid resins can be used. Suitable resins include the polyacrylic acid resins obtained by the copolymerization of acrylic acids and divinylbenzene by the procedure described on p. 87 of Kunin, supra. Carboxylic acid resins of this type are marketed under the trade names Amberlite IRC–50, Duolite CS–101, and Ionac C–270. In accordance with a preferred procedure for contacting the neutralized beer with the cation exchange resin, the beer is pumped downflow through a packed column of the resin. If desired, 1 to 8 mgs. of ethylenediamine tetraacetic acid per ml. of beer can be included in the filtered beer before contacting with the resin.

The adsorbed actinospectacin is eluted from the cation exchange resin as the sulfate salt. Elution is effected by charging the resin column with a suitable volume of water (enough is used to produce a slurry with the resin) and acidifying with sulfuric acid. The acid is added batchwise with vigorous mixing of the slurry until the pH of the mixture is maintained at about pH 1 to 4, preferably about pH 1.5 to 2.0. The acid solution is then drained from the resin column and the column is blown dry with air under pressure. If desired, the elution can be repeated in order to obtain further yield of actinospectacin from the resin.

In general, the advantages of the improved process of this invention are realized when about 4 volumes of methanol are added to an alkaline aqueous solution assaying from about 25,000 to about 160,000$\gamma$ of actinospectacin activity per ml., preferably 100,000 to 150,000$\gamma$/ml. of actinospectacin activity. Advantageously, the methanol is added with vigorous stirring and the mixture is filtered. After acidification, crystallization of the actinospectacin sulfate takes place readily at about 20° to 50° C. Reducing the temperature to about 0° to 15° C. before final filtration improves the yield.

It will be understood that the proportions of methanol effective for crystallization will vary with the concentration of actinospectacin sulfate and the presence or absence of inactive substances.

If desired, the actinospectacin sulfate thus obtained can be recrystallized by dissolving in water, adding a loweralkanone, for example, acetone or methyl ethyl ketone and crystallizing. The crystals are recovered on a filter, washed with aqueous alkanone solution, and, if desired, with anhydrous alkanone and then dried.

The following preparations and examples are illustrative of the process and products of the present invention, but are not to be construed as limiting. Unless otherwise specified, parts and percentages are by weight.

PREPARATION I

*Concentrate containing actinospectacin sulfate from whole beer*

24,500 gal. of whole beer obtained according to the procedure of Belgian Patent No. 596,175 from a culture of *Streptomyces spectabilis* was acidified to pH 2.8 with 153 gals. of 48.5° Bé. sulfuric acid and filtered with filter aid. The filtered beer was adjusted to about pH 6 with 47 gals. of 50% aqueous sodium hydroxide and 792 lbs. (approximately 4.0 mg. per ml.) of ethylenediamine tetraacetic acid was added. After thorough mixing, the beer was readjusted to about pH 6.5 to about pH 6.9 with 25.5 gals. of 50% aqueous sodium hydroxide. The neutralized beer was then polished with filter aid and contacted downflow through a carboxylic acid resin (hydrogen form) in two chromatographic columns (lead and trail columns connected in series) each containing about 250 gal. of resin. (The particular resin used was a 16 to 50 U.S. mesh bead resin obtained by the suspension polymerization of 95 parts acrylic acid and 5 parts divinylbenzene in the presence of 1 part of benzoyl peroxide according to Kunin, supra.) The columns were then washed with 500 gals. of deionized water and blown dry. For elution, the lead column was disconnected from the trail column, charged with 150 gals. of deionized water, and acidified with 9 gals. of about 96% sulfuric acid (C.P.) to about pH 1.8. The eluate containing actinospectacin as the sulfate salt was drained from the column and the column was blown dry. Elution was repeated with 125 gals. of deionized water adjusted to pH 1.8 with sulfuric acid. The eluates were combined and excess sulfuric acid was neutralized with 4.5 gals. of 50% aqueous sodium hydroxide to give about 250 gals. of eluate.

EXAMPLE 1

A quantity (750 ml.) of a column eluate prepared according to Preparation I and containing approximately 15,000$\gamma$/ml. of actinospectacin activity was concentrated to 100 ml. Fifty ml. of the concentrate was cooled to 10° C. and adjusted to pH 8 by addition of 50% aqueous sodium hydroxide. The alkaline eluate was mixed with 200 ml. of methanol slowly and with thorough mixing. After the addition of methanol was completed, the mixture was filtered and the filter cake was washed with 80% methanol and discarded. The filtrate was adjusted to pH 5.0 by addition of concentrated sulfuric acid and the actinospectacin sulfate crystallized. After 4 hours the crystals were recovered on a filter, washed with 80% methanol, washed with anhydrous methanol, and dried in air. The crystals were dissolved in 50 ml. of water, 1 g. of activated carbon (Carco G–60) was added for decolorization, and the mixture was thoroughly stirred at about 25° C. for 5 minutes. The mixture was filtered to remove the carbon and the filter cake was washed with 5 ml. of water. The combined filtrate and wash water was warmed to 50° C. and 40 ml. of acetone was added. The actinospectacin sulfate crystallized immediately and after holding in a refrigerator overnight the crystals were recovered on a filter, washed with 40% aqueous acetone, washed with anhydrous acetone, and dried. There was thus obtained 4.56 grams of actinospectacin sulfate assaying 640$\gamma$/mg. against *K. pneumoniae* and having an ash content of 0.05%.

EXAMPLE 2

A lead column eluate (250 gal.) prepared according to the procedure of Preparation I was concentrated under reduced pressure to a volume of 302 l. containing 60,000$\gamma$/ml. of actinospectacin activity. The solution was adjusted to pH 8 by addition of 50% aqueous sodium hydroxide solution. After adding 1200 l. of methanol, the mixture was stirred thoroughly and the precipitate removed by filtration. The pH was adjusted to 5.0 by addition of 60% aqueous sulfuric acid. The actinospectacin sulfate crystallized immediately and after stirring for 16 hours the crystals were recovered on a filter, washed, and dried in air. On recrystallization from aqueous acetone there was obtained 11.8 kg. of crystalline actinospectacin sulfate assaying 625$\gamma$/mg. against *K. pneumoniae* and having an ash content of 0.1%.

I claim:

1. The process for crystallizing actinospectacin sulfate from solutions containing the same which comprises adjusting pH to obtain an alkaline pH, adding methanol to precipitate insoluble metal salts and other impurities, filtering to remove the precipitated impurities, adding sulfuric acid to obtain acid pH, and recovering the crystalline actinospectacin sulfate.

2. The process according to claim 1 wherein:
   (1) the aqueous solution contains 25,000 gamma to 160,000 gamma per milliliter of actinospectacin sulfate activity,
   (2) the base added is alkali metal hydroxide,
   (3) the final alkaline pH is pH 7.5 to 8.5,
   (4) about 4 parts of methanol is added to 1 part of aqueous solution, and
   (5) enough sulfuric acid is added to bring the solution to pH 4.0 to 6.0.

3. The process according to claim 2 wherein:
(1) the aqueous solution contains from 100,000γ to 150,000γ per milliliter of actinospectacin sulfate activity,
(2) the base added is sodium hydroxide,
(3) the final alkaline pH is 8,
(4) four parts of methanol is added to 1 part of aqueous solution, and
(5) enough sulfuric acid is added to bring the solution to pH 5.0.

References Cited by the Examiner

UNITED STATES PATENTS 2,999,048  9/1961  Donovick _____ 167—65

OTHER REFERENCES

Antibiotics, Pratt and Dufrenoy (1949), pages 76, 126.
Handbook of Antibiotics, Baron, pages 101, 119, 126 (1950).

JULIAN S. LEVITT, *Primary Examiner.*
SAM ROSEN, *Assistant Examiner.*